W. A. Leggo,
Photographic Camera.
No. 113,067.   Patented Mar. 28, 1871.
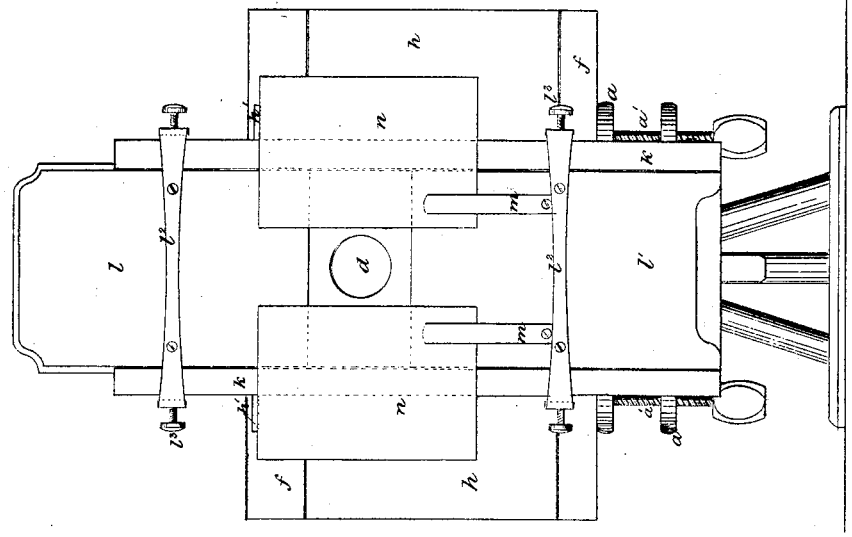
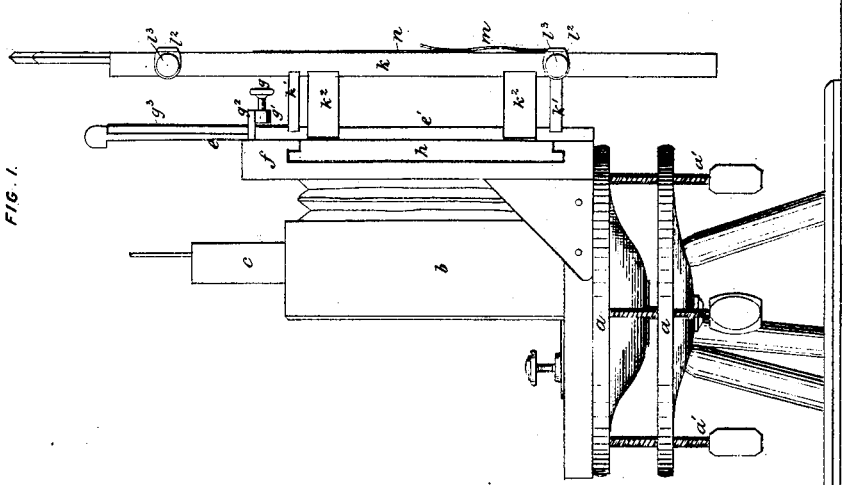
Witnesses  
Charles Legge  
Charles G. C. Simpson
Inventor  
W. A. Leggo

UNITED STATES PATENT OFFICE.

WILLIAM A. LEGGO, OF MONTREAL, CANADA.

IMPROVEMENT IN PHOTOGRAPHIC CAMERAS.

Specification forming part of Letters Patent No. 113,067, dated March 28, 1871.

*To all whom it may concern:*

Be it known that I, WILLIAM AUGUSTUS LEGGO, of the city of Montreal, in the district of Montreal, in the province of Quebec, Canada, gentleman, have invented new and useful Improvements on Photographic Camera; and I do hereby declare that the following is a full, clear, and exact description of the construction and operation of the same, reference being had to the annexed drawing, where—

Figure I represents a side elevation of camera. Fig. II represents a front elevation of camera.

This invention relates to improvements in photographic cameras, whereby the necessity of tilting the camera to obtain views of any object, either much above or below the level of the eye of the operator, is avoided, thus preserving in the resulting picture the perpendicular lines of the object true to nature, and keeping, by suitable arrangements, the views from falling away too suddenly to a point; for preventing any rays of light, except those emanating from the object to be copied, from entering the interior of the camera, and enabling a picture to be made at two exposures, combining definiteness and animation, the two pictures being blended together without any dividing-line being apparent.

In the drawing similar letters of reference indicate like parts.

Letter $a$ is the camera-stand, of any ordinary or convenient form, provided with screws $a'$ $a'$, for the purpose of adjustment; $b$ is the camera-box, and $c$ the shield, in position for exposing sensitized plate.

The lens $d$ is contained in a slide, $e$, moving freely up and down in grooves $e'$ $e'$ on the front face, $f$, of the camera-box $b$. This slide may be fixed at any height to suit the operator by means of a screw, $g$, or its equivalent, passing through an eye, $g^1$, attached to a metal collar, $g^2$, placed round the slide $e$, and pressing against a metal plate, $g^3$, or other contrivance, in the face of the slide $e$.

A slide, $h$, moving horizontally in grooves, is formed in the front face, $f$, of the camera-box, in order to give the lens $d$ contained in the perpendicular slide $e$ any required degree of lateral motion, the collar $g^2$ moving in a groove, $h'$, provided for that purpose.

The contrivance for excluding from the interior of the camera-box any unnecessary rays of light is as follows: A frame, $k$, provided with guides $k^1$, is attached, by means of metal clamps $k^2$, or their equivalents, to the horizontal slide $h$, moving freely with it. In this frame $k$ are contained shutters $l$ $l^1$, moving in a vertical direction in grooves, and provided with metal or other suitable clamps $l^2$, securely fixed to the shutters $l$ $l^1$, clasping loosely the frame $k$, and provided with screws $l^3$, or other contrivance for holding the shutters firmly at any required height. To the lower shutter, $l^1$, are attached vertical hold-fasts $m$, preferably of metal, for holding in position slides $n$, of metal or any other suitable material, for the purpose of closing laterally the aperture between the shutters.

The construction of my invention being practically as above, I will proceed to describe the *modus operandi*.

In order to take a picture of any high object, such as a house, monument, &c., or any view above the level of the eye, the camera-box is placed level and the lens $d$ brought into the proper position by raising the perpendicular slide which holds it to the required height, and securing it firmly by means of the screw $g$ passing through eye $g^1$ of collar $g^2$, and pressing against metal plate $g^3$, or any other analogous contrivance for keeping the slide in place, the effect of this arrangement being that all the upright lines of the picture retain their vertical direction, whereas, if the camera was tilted, the perpendicular lines of the picture would be thrown out of plumb on the plate, giving the picture a strained and unnatural appearance. The shutters $l$ $l^1$ are now shifted up or down and fixed in their proper position by the clamps $l^2$ and screws $l^3$, as may be required, to exclude the extraneous rays of light from the lens $d$, the slides $n$ held in the strips $m$ being moved laterally, further working for that object. The camera and lens are now ready for photographing the object.

In like manner, also, if the object to be photographed is below the level of the eye, the lens $d$ can be, by means of the slide $e$, lowered to the proper position, thus obviating in any case the necessity of tilting the camera.

Again, by the lateral motion given by the horizontal slide $h$, the views are prevented from too rapidly falling away to a point.

The *modus operandi* of taking a picture at two exposures is as follows: The camera having been placed in the position, and arranged substantially in the manner above described, the lower shutter, $l^1$, is raised so that the foreground not required is no longer visible on the focusing-glass. The situation of the shutter $l^1$ is marked on the frame $k$ for future reference, and it is again raised until all animate objects in foreground are shut out of the view. At this point the shutter $l^1$ is secured by the clamps $l^2$ and screws $l^3$. The upper shutter, $l$, is then brought down till all sky not wanted for the view is cut off and secured at that point. The side slides $n\ n$ are now arranged so as to exclude all side lights. A small diaphragm being applied to the lens the camera is ready for taking the upper portion of view. The exposure being continued as long as is thought necessary by the operator, the light is shut off from the lens in the ordinary manner, the upper shutter, $l$, is loosened and lowered down till its lower edge meets the upper edge of the lower shutter, $l^1$, and at that point it is again made fast by the clamps $l^2$ and screws $l^3$. The lower shutter, $l^1$, is now lowered to the marked point before mentioned and there secured. The lower part of the picture may now be taken, using a larger stop or diaphragm and a shorter exposure than the first or upper half, the length of the exposures in each case being left to the discretion of the operator.

Having now described the construction and operation of my invention, to which I have given the name of "Leggo's Improved Photographic Camera," I beg to state that what I claim as my invention, and wish secured by Letters Patent, is—

1. The novel arrangement of the lens $d$, vertical slide $e$, face of camera-box $f$, screw $g$, eye $g^1$, collar $g^2$, plate $g^3$, horizontal slide $h$, grooves $h'$, or their equivalents, all working together, substantially in the manner and for the purpose described.

2. The novel construction and arrangement of the frame $k$, guides $k^1$, clamps $k^2$, shutters $l\ l^1$, clamps $l^2$, screws $l^3$, vertical hold-fasts $m$, and slides $n$, or their equivalents, all working together substantially in the manner shown, and for the purpose of excluding from the interior of the camera-box all rays of light but those coming directly from the object to be photographed.

3. The novel combination and arrangement of the frame $k$, guides $k^1$, clamps $k^2$, shutters $l\ l^1$, clamps $l^2$, screws $l^3$, vertical hold-fasts $m$, and slides $n$, or their equivalents, all working together for the purpose of producing at two exposures a picture having the two exposures blended together with no apparent dividing-line, substantially in the manner and for the purpose described.

Montreal, the 9th day of February, A. D. 1871.

W. A. LEGGO.

Witnesses:
  S. J. NOYES,
  CHARLES G. C. SIMPSON.